US005409247A

United States Patent [19]

Robertson et al.

[11] Patent Number: 5,409,247

[45] Date of Patent: Apr. 25, 1995

[54] WHEELCHAIR FRAME

[76] Inventors: A. Scott Robertson, 3387 Market St., San Francisco, Calif. 94114; Richard Geiger, 1709 High St., Alameda, Calif. 94107

[21] Appl. No.: 107,195

[22] Filed: Aug. 17, 1993

Related U.S. Application Data

[63] Continuation-in-part of Ser. No. 789,173, Nov. 8, 1991, Pat. No. 5,267,745.

[51] Int. Cl.[6] .......................... A61G 5/00; B62M 1/14

[52] U.S. Cl. .......................... 280/250.1; 297/DIG. 4; 403/172

[58] Field of Search .......................... 280/250.1, 304.1; 297/DIG. 4; 403/169, 172

[56] References Cited

U.S. PATENT DOCUMENTS

| | | |
|---|---|---|
| D. 254,970 | 5/1980 | Honzyou . |
| 3,379,450 | 4/1968 | Jones et al. . |
| 4,405,142 | 9/1983 | Whetstine . |
| 4,650,201 | 3/1987 | Hartwell . |
| 4,652,005 | 3/1987 | Hartwell . |
| 4,721,321 | 1/1988 | Hanry et al. . |
| 4,730,842 | 3/1988 | Summers et al. . |
| 4,966,379 | 10/1990 | Mulholland . |
| 5,020,816 | 6/1991 | Mulholland . |
| 5,060,962 | 10/1991 | McWethy . |
| 5,152,543 | 10/1992 | Sims et al. . |

FOREIGN PATENT DOCUMENTS

| | | |
|---|---|---|
| 501986 | 5/1954 | Canada . |
| 312969 | 4/1989 | European Pat. Off. . |

*Primary Examiner*—Mitchell J. Hill

*Attorney, Agent, or Firm*—Burns, Doane, Swecker & Mathis

[57] ABSTRACT

A wheelchair frame is defined by a pair of side frame assemblies that are rigidly connected to each other by a seat pan. Each side frame assembly includes a seat mounting member on which the seat pan is mounted, a bottom member connected to the seat mounting member, and a footrest member pivotally connected to the seat mounting member and rigidly connected to the bottom member. A drive wheel mounting assembly can include a generally U-shaped mounting block for being mounted on a bottom member of each side frame assembly, and a drive axle receiving arrangement mounted on each mounting block for receiving a drive wheel axle. The bottom member can be provided with a flat surface upon which the drive axle receiving arrangement is placed. A caster wheel mounting assembly mounted on each bottom member can include a caster wheel mount having two spaced apart forks for receiving a caster wheel, a stem connected to the caster wheel mount, a caster sleeve in which the stem is positioned, and a bearing disposed between the caster sleeve and the stem for allowing rotational movement of the caster sleeve relative to the stem and the caster wheel mount. To adjust the seat pan angle, the rear end of each bottom member can be curved upwardly and provided with a plurality of holes arranged along an arc having a center of curvature that corresponds to the pivot connection between the seat mounting member and the footrest member.

25 Claims, 8 Drawing Sheets

WHEELCHAIR FRAME

This application is a continuation-in-part of U.S. patent application Ser. No. 07/789,173, filed on Nov. 8, 1991 and entitled "Wheelchair and Wheelchair Frame," now U.S. Pat. No. 5,267,745 issued on Dec. 7, 1993.

BACKGROUND OF THE INVENTION

The present invention relates to a wheelchair and particularly to a wheelchair and to a wheelchair frame.

OBJECTS AND SUMMARY OF THE INVENTION

A long-felt need in the art of wheelchair design is the need to improve wheelchair maneuverability. It has long been known that a reduction in weight aids in obtaining such an improvement, however, such weight reductions are typically accompanied by unacceptable losses in structural rigidity.

It has also been known to design wheelchair frames so as to orient a user's weight on the wheelchair in a manner favorable to improved maneuverability. Such frames, however, often require expensive manufacturing techniques and materials in order to provide a suitably configured frame without unacceptable weight increases.

Another longfelt need in the art of wheelchair design is the need to provide a wheelchair that is universally adjustable to accommodate the widest variety of users for the widest variety of uses. This need has lead to numerous wheelchair designs that, while offering the desired adjustability, are bogged down with numerous supplementary parts and pieces. These extra parts and pieces increase the wheelchair weight and often require the user to carry specific tools in order to carry out desired adjustments.

Accordingly, it is an object of the present invention to provide a wheelchair that addresses these longfelt needs in wheelchair design.

It is an object of the present invention to provide a wheelchair that is highly maneuverable without unacceptable loss in structural rigidity.

It is an object of the present invention to provide a wheelchair that is highly maneuverable and is lightweight.

It is an object of the present invention to provide a wheelchair that is universally adjustable to accommodate a wide variety of users and a wide variety of uses.

It is an object of the present invention to provide a wheelchair that is easily adjustable with a minimum of tools.

It is an object of the present invention to provide a wheelchair that is durable.

In accordance with one aspect of the present invention, a wheelchair frame comprises: a pair of side frame assemblies, each of which includes a bottom member and a seat mounting member that are connected to one another, each bottom member having a flat upwardly facing surface at a rear region of the bottom member; a generally U-shaped mounting block for being mounted on each bottom member at the rear region of the bottom member, each mounting block being open upwardly and having an upwardly facing end surface; drive axle receiving means mounted on each mounting block for receiving a drive wheel axle, each drive wheel axle receiving means including a mounting plate portion and an axle receiving portion, said mounting plate portion and said axle receiving portion being integral and formed in one piece, said mounting plate being positioned on the end surface of a respective mounting block and resting on the upwardly facing flat surface at the rear region of the bottom member; connection means for removably connecting said drive axle receiving means to a respective mounting block to allow the drive axle receiving means to be disconnected from the respective mounting block so that the drive axle receiving means and the mounting blocks can be moved longitudinally along the rear region of the bottom member; and support means for rigidly connecting said side frame assemblies to one another, said support means including a cross-bar connected to each mounting block and extending between the side frame assemblies.

In accordance with another aspect of the present invention, a wheelchair frame comprises: a pair of side frame assemblies which each include a bottom member and a seat mounting member connected to the bottom member; drive wheel axle mounting means mounted on each bottom member for mounting a drive wheel on each side frame assembly; rigid support means extending between the two side frame assemblies for rigidly connecting the two side frame assemblies to one another; and a caster wheel mounting assembly connected to each bottom member, each caster wheel mounting assembly including a caster wheel mount having two spaced apart forks for receiving therebetween a caster wheel, means for mounting a caster wheel on said forks, a stem connected to the caster wheel mount, a caster sleeve in which the stem is positioned, and bearing means disposed between the caster sleeve and the stem for allowing rotational movement of the caster sleeve relative to the stem and the caster wheel mount.

In accordance with a further aspect of the present invention, a wheelchair frame comprises: a pair of side frame assemblies which each include a bottom member, a seat mounting member having a rear end that is connected to the rear end of the bottom member, and a foot rest member connected to the seat mounting member and the bottom member; drive wheel axle mounting means mounted on each bottom member for mounting a drive wheel on each side frame assembly; caster wheel mounting means mounted on each bottom member for mounting a caster wheel on each side frame assembly; rigid support means extending between the two side frame assemblies for rigidly connecting the two side frame assemblies to one another; and connecting means for connecting each seat mounting member to an upwardly curved rear end portion of a respective bottom member, said upwardly curved rear end portion of each bottom member having a plurality of spaced apart mounting positions, each connecting means being shaped to mate with the rear end portion of the respective bottom member and each connecting means having at least one through hole extending therethrough, each connecting means being movable along the rear end portion of the respective bottom member so that the through hole in the connecting means is alignable with one of the mounting positions.

BRIEF DESCRIPTION OF THE DRAWING FIGURES

Preferred embodiments of the present invention will be described in detail below with reference to the accompanying drawing figures, wherein like reference numerals identify like elements and wherein.

DETAILED DESCRIPTION OF THE PREFERRED EMBODIMENTS

A wheelchair and wheelchair frame in accordance with the present invention (FIG. 1) is formed of a chassis that includes a pair of side frame assemblies 101, 102. The two side frame assemblies 101, 102 are connected to each other to form a rigid frame by a seat pan 250 and a cross-beam 230. By utilizing the seat pan 250 as a structurally supportive member, the use of additional cross-beams can be avoided.

Figure 8:
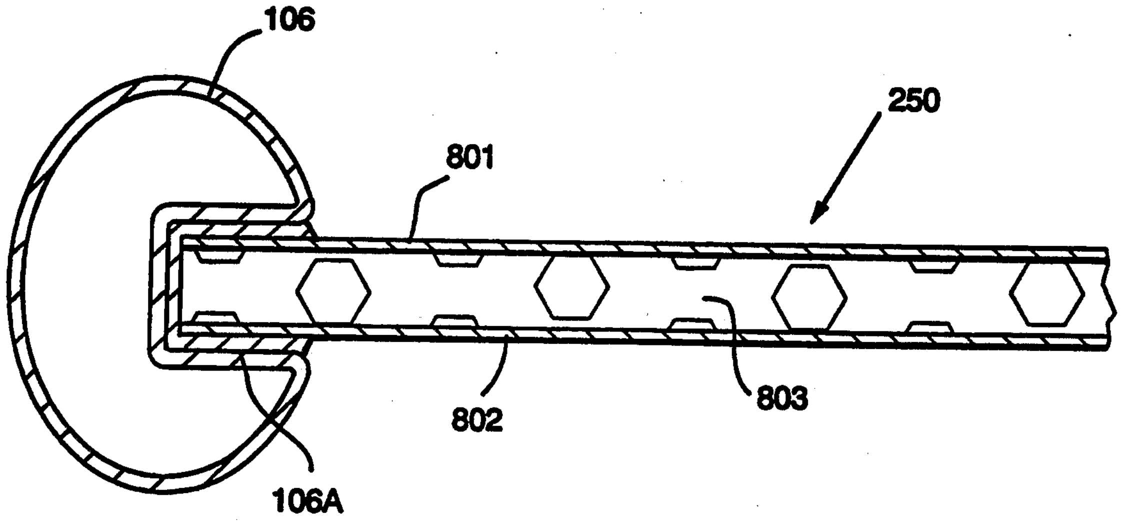
FIG. 8 is a cross sectional view of a seat pan used in a preferred embodiment of a wheelchair and wheelchair frame in accordance with the present invention.

To provide the required structural rigidity to the connection of the two side frame assemblies 101, 102, the cross-beam 230 can be made from any sufficiently strong metallic material such as aluminum or a sufficiently strong composite material. Similarly, the seat pan 250 can also be made from any suitably strong material. However, to reduce weight while maintaining structural rigidity, the seat pan 250 in one preferred embodiment is fabricated as a sandwich laminate (FIG. 8). Such a sandwich laminate includes a pair of outside or "skin" layers 801, 802 separated by a sandwich core 803. The skin layers 801, 802 provide the structural rigidity and load bearing characteristics required for connecting the two side frame assemblies 101, 102 together while the core material 803 serves to keep the two skin layers separated.

Since the skin layers are structurally supportive, they must be fabricated from sufficiently strong materials. Aluminum may be used as well as a sufficiently reinforced composite. However, since the core material need only be strong enough to keep the skin layers separated, any number of suitable lightweight materials may be used. For example, a composite honeycomb material (FIG. 8), a metallic honeycomb material or an expanded plastic material are all acceptable. Other core materials that may be considered are foam, corrugated paper or even air.

Mounted on the frame formed by the connection of the two side frame assemblies 101, 102, (FIG. 1) are a pair of drive wheels 115, 116, a caster assembly 202, a backrest assembly 240, and a foot rest 220. Each of these items is attached to the wheelchair frame in a manner that is discussed in greater detail below. On the seat pan 250 is mounted a seat cushion 249.

Figure 3:
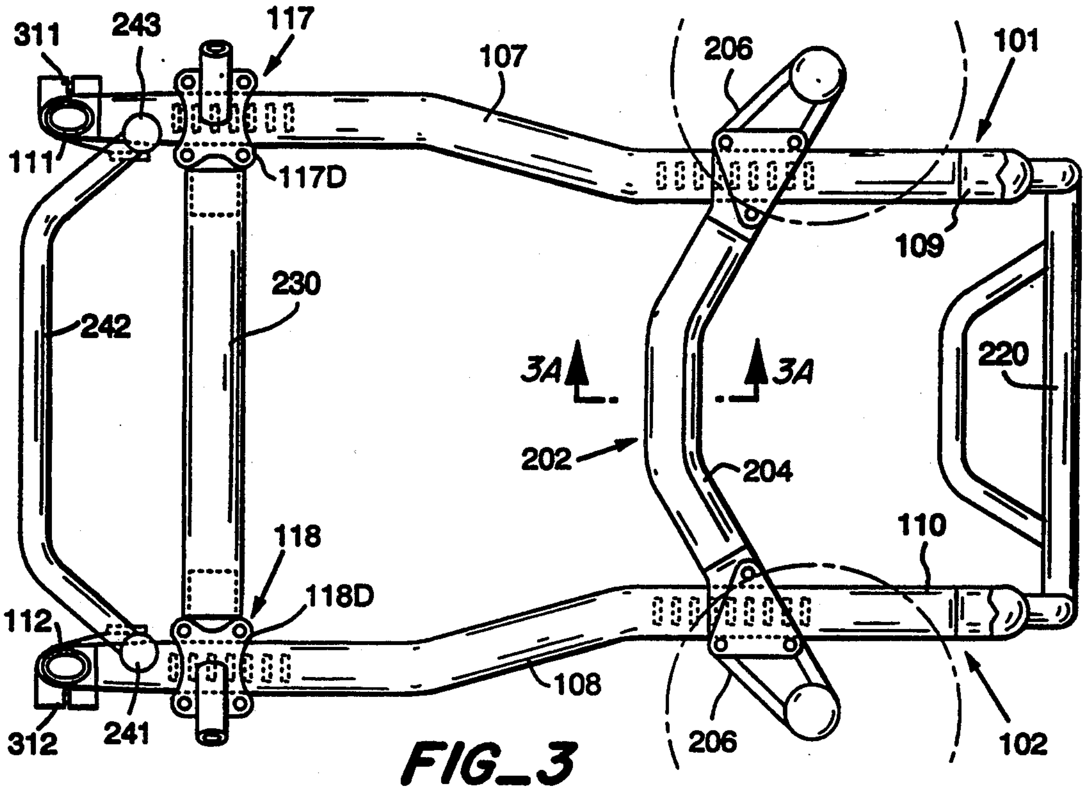
FIG. 3 is a top view of a first embodiment of a wheelchair and wheelchair frame with the seat removed in accordance with the present invention.
Figure 4:
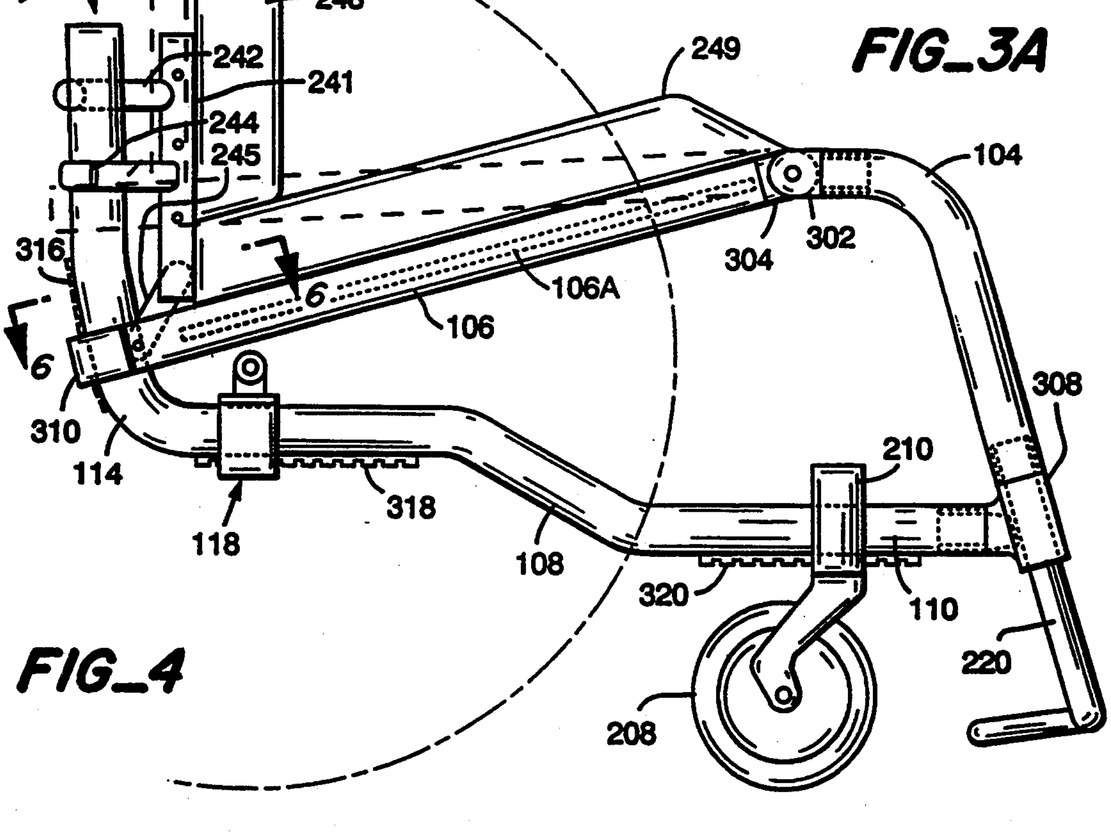
FIG. 4 is a side view of a first embodiment of a sport wheelchair and wheelchair frame in accordance with the present invention.
Figure 5:
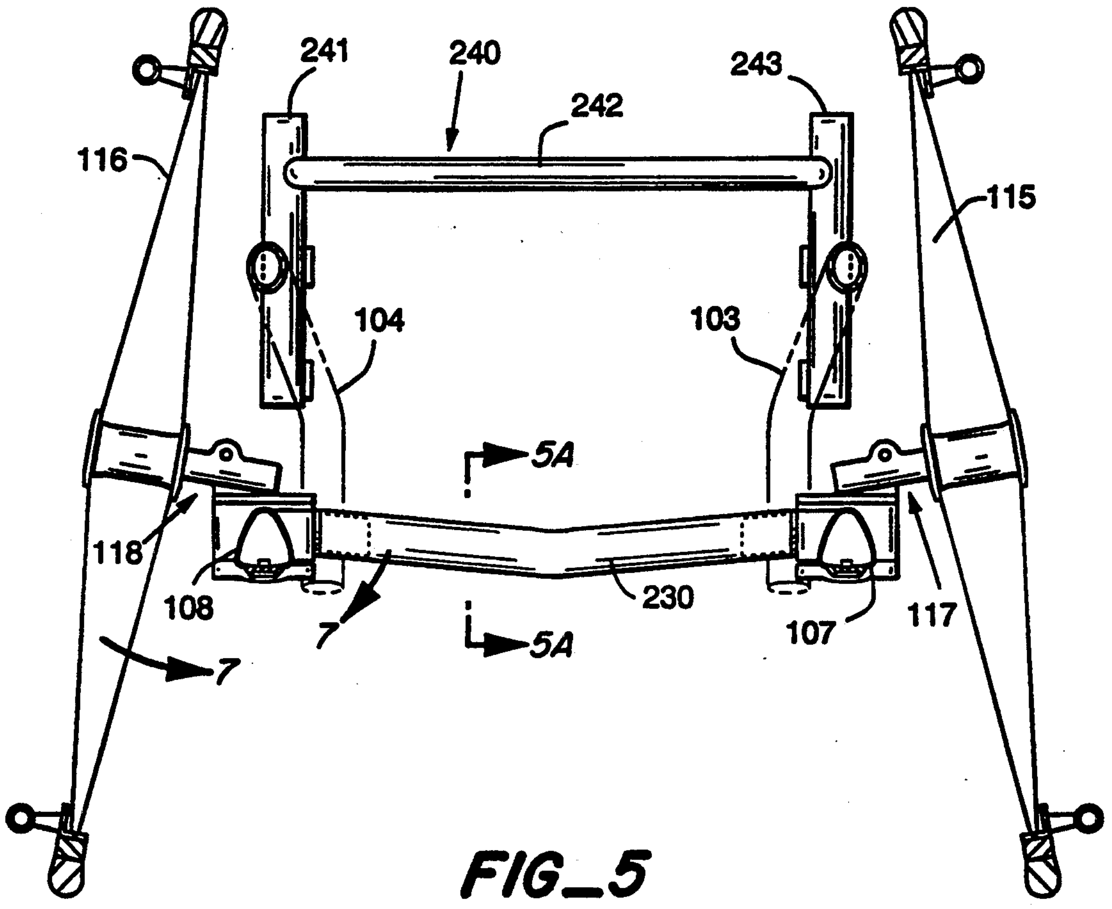
FIG. 5 is a front cross sectional view of a first embodiment of a wheelchair and wheelchair frame in accordance with the present invention.
Figure 5A:
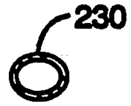
FIG. 5A is a cross sectional view taken along the section line 5A—5A in FIG. 5.

Each side frame assembly 101, 102 includes three members (FIG. 1), a bottom member 107, 108, a foot rest member 103, 104, and a seat member 105, 106. Furthermore, each bottom member 107, 108, includes a forward end 109, 110 that extends in a generally horizontal direction and a rearward end 111, 112 that extends in a generally upward direction. The rearward end 111, 112 of each bottom member 107, 108 includes a curved portion 113, 114. The forward end 109, 110 is separated from the rearward end 111, 112 by a middle region that is configured to position the forward end 109, 110 at a location lower than, and inwardly from, the rearward end 111, 112 (FIGS. 3 and 4).

The seat back assembly 240 is mounted to the rearward ends 111, 112 of each bottom member 107, 108 by split clamps 244 and by clamps 310. The caster assembly 202 is mounted to a region near the front end 109, 110 of each bottom member 107, 108 by clamps 206. Mounted on the middle region of each bottom member 107, 108 are axle receiving assemblies 117, 118 for the drive wheels 115, 116. The seat pan 250 is mounted in slots 105A, 106A of each seat member 105, 106 (FIGS. 1, 2, 4 and 8).

The two side frame assemblies 101, 102 are substantially identical in construction. Hence, the description of one side frame assembly 102 is equally applicable to the other side frame assembly 101 (FIG. 2).

One end of the footrest member 104 is connected to the forward end 110 of the bottom member 108 by a lug 308. The lug 308 is adhesively bonded to both the forward end 110 of the bottom member 108 and to the footrest member 104. The seat member 106 extends from an opposite end of the footrest member 104 to the rearward end 112 of the bottom member 108.

Figure 2:
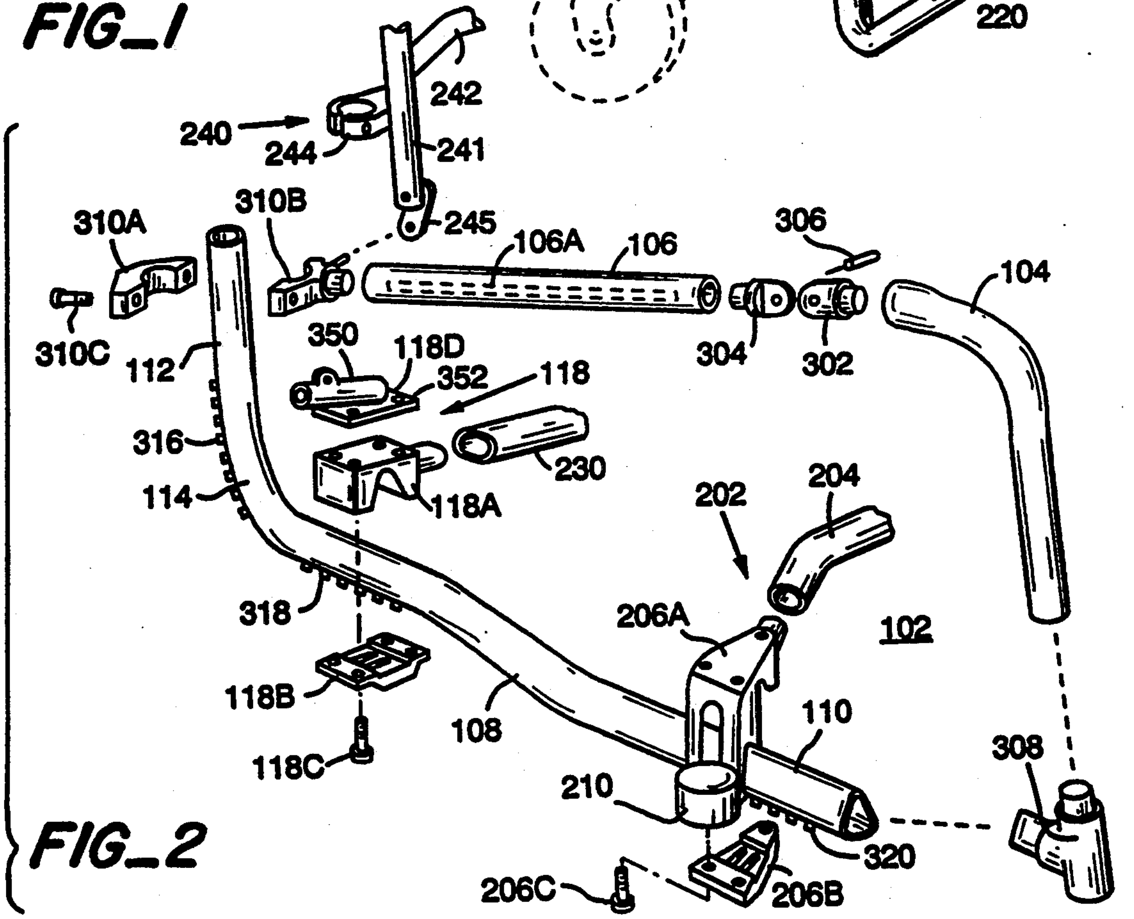
FIG. 2 is a blown-up view of a side of a first embodiment of a wheelchair and wheelchair frame in accordance with the present invention.

The seat member 106 is connected to the footrest member 104 by a pivot joint and lug assembly that includes pivot lug fork 302, pivot lug plug 304 and pivot pin 306 (FIG. 2). Each of the lugs 302, 304 are adhesively bonded to the foot rest member 104 and the seat member 106, respectively. The opposite end of the seat member 106 is adjustably connected at a location along the curved portion 113 of the rearward end 112 of the bottom member 108 by a clamp assembly 310 that includes clamp halves 310A, 310B connected together with commonly known fasteners 310C.

Figure 1:
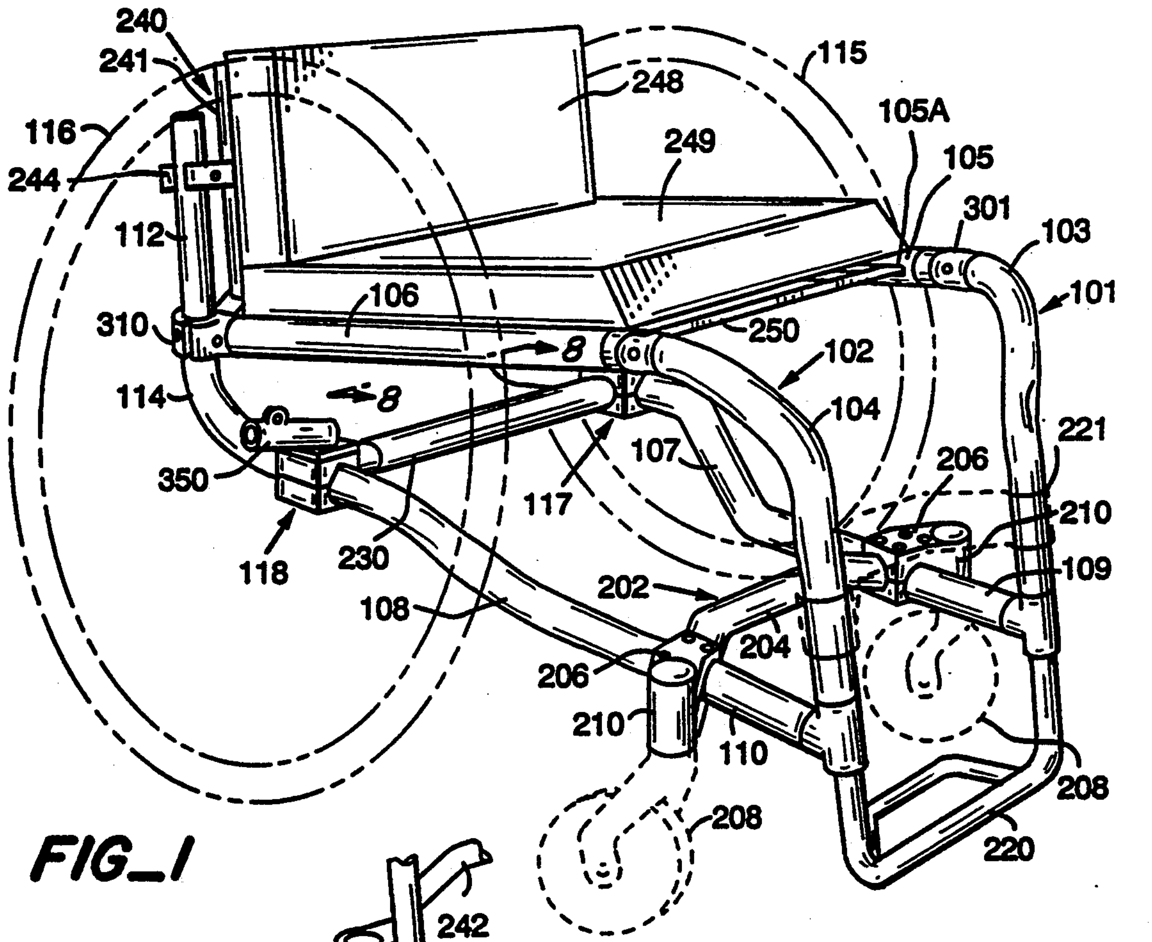
FIG. 1 is a perspective view of a first embodiment of a wheelchair and wheelchair frame in accordance with the present invention.

Due to the pivot joint between the foot rest member 104 and the seat member 106, the seat member 106 (and therefore seat pan 250) can pivot so as to adjust the seat pan angle according to the desire of the user. The final location of the clamp 310 on the curved portion 114 will set the seat pan angle. As will be recognized, the pivot point 301 can be located at any desired position along the upper frame or lower frame forward of the caster wheel assembly. In one embodiment, seat member 106 and foot rest member 104 can be merged into a single member, and pivot joint 301 can be positioned in bottom member 110 forward of the caster assembly 202, or at the end of bottom member 110, or at lug 308. A preferred embodiment is shown in FIGS. 1, 2 and 4, wherein pivot joint 301 is positioned between the seat member 106 and the leg rest member 104.

The curved portion 114 of the bottom member 108 has a radius of curvature that is substantially equal to the length of the seat member 106. Consequently, the clamp 310 may be freely moved along this curved portion 114 without a need to vary the length of seat member 106 or to somehow change orientation of the rearward end 112 of the bottom member 108 (FIG. 4).

Figure 7:
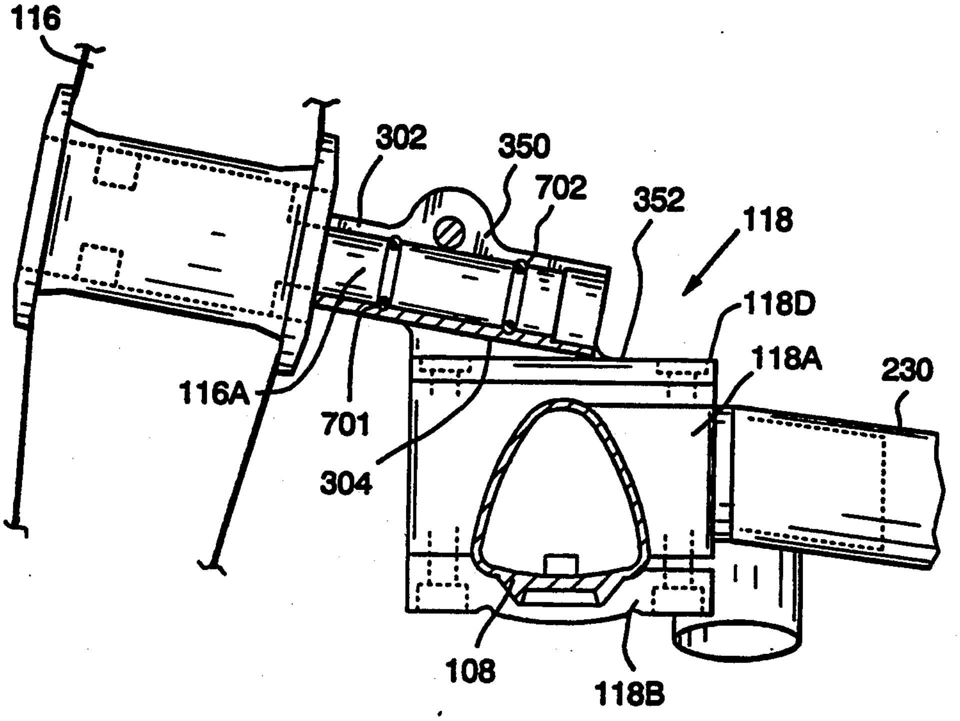
FIG. 7 is a cross sectional view taken along the section line 7—7 of FIG. 5.

The axle-receiving assembly 118 is mounted to a middle region of the bottom member 108 and includes clamp halves 118A, 118B that are secured to one another by commonly known fasteners 118C. Secured to the top clamp half 118A is an interchangeable axle receiving platform 118D (FIG. 7).

Each interchangeable axle-receiving platform 118D (FIGS. 1–3, 5 and 7) includes an axle-receiving cylinder 350 that extends at a predetermined angle from a flange 352. The angle from which the axle-receiving cylinder 350 extends provides a predetermined camber angle to the drive wheel whose axle is ultimately mounted in the cylinder 350. The axle of a drive wheel is secured in the axle-receiving cylinder 350 by a split clamp (not shown). However, to remove undesirable clearance that often exists, a pair of O-rings 701, 702 are included inside the cylinder 350 (FIG. 7).

The thickness of the flange 352 for each interchangeable platform 118D varies according to each camber angle provided by each platform. The thickness varies such that the wheelchair frame is maintained at a constant level relative to the traveling surface for any camber angle provided to the wheels by the axle receiving cylinder 350. For example, the flange on a platform 118D providing one camber angle will be thicker on a platform 118D providing a greater camber angle.

However, in order for a user to also adjust the wheelchair frame height, a set of interchangeable axle-receiving platforms 118D may be provided for each different desired wheelchair frame height. The thickness of flange 352 for each platform 118D in a different set provides the desired frame height for that set; however, the thickness of flange 352 of each platform within that set varies from other flange thicknesses in that set in a manner to still provide the advantage of changing camber angle without changing the particular frame height for that set. In this manner, even greater adjustability is offered to the user.

Such adjustability is especially advantageous when a user decides to change from the current drive wheels to another set of drive wheels that have a different diameter than the original drive wheels. Having different sets of interchangeable axle-receiving platforms 118D to choose from, the user can either maintain the same frame height as with the original drive wheels or change to a different frame height. Moreover, once a particular set of platforms is chosen, the user can maintain that selected frame height and still vary the camber angle of the drive wheels.

The caster assembly 202 includes a pair of casters 208 secured in a caster retention member 210. The casters 208 are attached to opposite ends of a crossbar 204 by means of a clamp 206 (FIGS. 1, 2 and 3). The clamp 206 includes two clamp halves 206A, 206B which are secured together by commonly known fasteners 206C.

Each clamp 206 of the caster assembly 202 is secured at a desired location along a front region of the front and 110, 109 of each front member 107, 108. Since both casters are attached to the crossbar 204, the casters 208 can be simultaneously moved forward or rearward along the bottom members 107, 108. Such simultaneous movement eases the adjustment of the caster wheels since proper alignment is better ensured.

Figure 6:
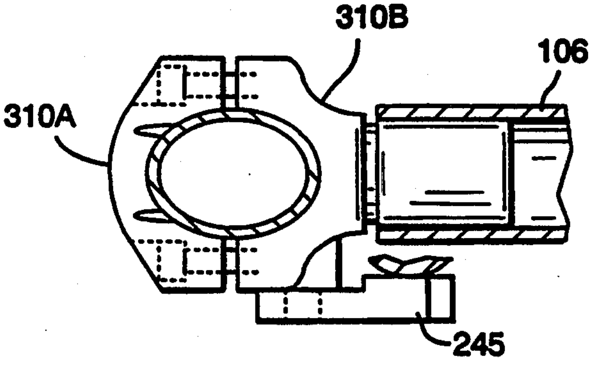
FIG. 6 is a cross sectional view taken along the section line 6—6 of FIG. 4.

The forward end 110 of the bottom member 108 has a cross section that is substantially triangular (FIG. 2). Furthermore, the clamp halves 206A, 206B are fabricated to conform to this generally triangular cross section. Consequently, the clamp 206 is maintained in a proper circumferential location around the forward end 110 despite any torque or moment arm that is applied to the caster assembly 202. The cross-section of forward end 110 can have any non-round shape and the same result will be achieved as long as clamp halves 206A, 206B are fabricated to conform to the same non-round cross section. The rearward end 112 of the bottom member 108 has a generally circular cross section (FIGS. 3 and 6).

Figure 3A:
FIG. 3A is a cross-sectional view taken along the section line 3A—3A of FIG. 3.

The cross bar 204 of the caster assembly 202 has a U-shape such that the cross bar curves inwardly in a direction toward the rear of the wheelchair when the caster assembly 202 is mounted on the chassis (FIG. 3). The U-shape allows greater room for a user during movement into and out of the chair. Furthermore, the cross bar 204 is configured such that a user's feet may be rested upon the cross bar member 204. In a preferred embodiment, such a configuration includes the cross bar 204 having a non-round cross section (FIG. 3A). Allowing placement of the user's feet in this manner reduces the polar moment of inertia of the wheelchair during use which is especially useful during sporting events when greater maneuverability is desired.

To ensure that the clamp 310 for the seat member 106, the clamp 118A, 118B for the axle-receiving assembly 118 and the clamp 206 for the caster assembly 202 are secured in a desired location, a serrated strip 316, 318, 320 is fixed to the curved portion 114, to a portion of the middle region and to a forward end region of the bottom member 108, respectively (FIGS. 2 and 4). Accordingly, each clamp is movable to distinct positions along said bottom member 108 according to locations of the serrations on each strip. The strips may be fabricated to have a color scheme such that placement of each clamp on each of the bottom members 107, 108 can be matched for allowing visual verification of proper alignment.

The seat back assembly 240 (FIGS. 1–5) includes a pair of posts 241, 243 connected to each other by a push bar 242. Mounted on the posts is a seat back cushion 248. Each post 241, 243 includes a split clamp 244 and a pivoting tab member 245 for connecting the seat back assembly to the rearward ends 112, 111 of the bottom members 107, 108. The tab member 245 pivotally connects the clamp 310 for the seat member 106 to the post 241 of the seat back assembly 240 and pivots according to placement of the clamp 310 along the curved position 114 of the bottom member 108 (FIGS. 1, 4 and 6). The split clamp 244 along with the clamp 310 secures the seat back assembly at a desired vertical location along the rearward ends 111, 112 of the bottom members 107, 108 (FIG. 2). Moreover, the pivoting movement allowed by the tab member 245 enables the seat back assembly to maintain suitable angular orientation relative to the seat pan 250 regardless of the ultimate seat pan angle.

Connected to the ends of the foot rest members 103, 104 is a U-shaped footrest 220 (FIGS. 1, 3 and 4). Opposite ends of the footrest 220 are telescopically received in each footrest member 103, 104 through the lug 308. The lug 308 includes a set screw (not shown) for securing the footrest 220 in a desired position. A leg rest strap 210 spans across the distance between the footrest members 103, 104 to provide further support to a user's legs.

Each side frame assembly 101, 102 is assembled by means of tubes and lugs only (FIG. 2) with the wheel assemblies 230, 202 (FIG. 1) mounted by means of clamps and the footrest assembly 220 (FIG. 1). Consequently neither the lower member 108, the leg rest member 104 nor the seat member 106 needs any through holes to accommodate common fasteners (e.g. bolts, pins, etc.). The absence of such through holes thus precludes the presence of stress risers in the frame members, which in turn improves reliability and durability of the frame.

The various structural elements of the wheelchair can be fabricated from any suitable materials and by any suitable methods. However, in order to achieve optimum weight, it is desirable that the bottom members 107, 108 and the footrest members 103, 104 be made from composite material.

The seat member 105, 106 may also be fabricated from any suitable material. If such material is composite, the slot 105A, 106A could be a molded in feature of the seat member 105, 106.

The construction of a wheelchair frame assembly or wheelchair frame according to this invention by providing tubular members, cutting the tubular members to the desired length, and inserting into the ends of said tubular members the appropriate lug members for attachment of the tubular members to other tubular members provides numerous advantages and efficiencies in the wheelchair frame structure as well as the manufacture of the wheelchair frames.

The wheelchair frame construction according to the present invention using the tubular members with the lug members adhesively bonded into the ends of the tubular members provides a wheelchair frame construction wherein the tubular members need not have any through holes or other penetration of the walls of the tubular members. The absence of through holes in the tubular members enables the construction of the wheelchair frame using thinner and lighter weight tubular members having thinner wall thickness than would be necessary if the tubular structure were weakened by having through holes or other penetrations of the walls of the tubular members. This is true whether the tubular members are metal such as aluminum, titanium, etc. or are of various fiber reinforced resin or composite materials.

The tubular member/lug member construction of a wheelchair frame according to the present invention also provides numerous other structural advantages for the wheelchair frame. The tubular members can be constructed of varying cross section shapes of varying diameters and wall thicknesses along the length of the tubular members to provide various strength and flex properties in various portions along the tubular members. This is particularly preferred in making composite tubular members wherein the fiber reinforcement can be configured as a braided sleeve, wound fibers, woven fabric, longitudinal fibers, etc. In molding a fiber reinforced polymer composite tubular member, the cross sectional shape, wall thickness, shape of the tube, orientation of the fibers can all be selected as desired without regard to the necessity of reinforcing points where through holes would be placed according to conventional construction.

Construction of the tubular member/lug member frame according to the present invention, provides full flexibility for attachment of tubular members tó each other using lug members which are inserted and adhesively bonded into the ends of the tubes, lug members which clamp the intermediate areas of other tubular members, lug members which contain pivot points wherein one tubular member can be pivotally mounted relative to another tubular member, and lug members which contain an inside opening for the telescoping of another tubular member therein. Other types of lug members can be employed in the wheelchair frame according to this invention.

As illustrated in the drawings in this application, the tubular members can assume various noncircular cross sectional shapes which particularly facilitate clamping of various lug members to the intermediate portion of a noncircular tubular member whereby rotation around the tubular member is prevented in order to maintain the desired alignment of the member clamped on the noncircular tubular member. For example, in FIGS. 1 and 2, upper tubular members 103, 104, 105 and 106 are generally circular in cross section, except that 105 and 106 are shaped to receive the seat pan. Lower tubular members 107 and 108 are triangular in shape to provide means to prevent clamps such as 118 and 206 from being able to rotate or slip around the lower tubular member. This noncircular cross section of the tubular member enables the accurate maintenance of alignment and positioning of the clamp and the cross members attached to those clamps.

The tubular member/lug member construction of a wheelchair frame according to the present invention enables convenient transition from one tubular member to another tubular member or other structural member. For example, lug members may be inserted into and adhesively bonded into a tubular member to transition from one type of metal tubular member to another type of metal tubular member, or to transition from a composite tubular member to a metal tubular member, or simply to transition from one structural member to another structural member.

The tubular member/lug member construction of wheelchair frames according to the present invention also provides convenient means for incorporating various aspects and advantages of composite tubular construction which are known in other technology areas, but heretofore unknown in the wheelchair art. For example, the wheelchair frame construction according to the present invention can incorporate various designs of composite construction wherein the reinforcing fiber orientation is constructed to achieve various strength and flexural properties of the tubular members at specific locations as desired for the wheelchair frame design. The composite tubular members can be constructed to provide an anisotropic wheelchair frame, i.e., frame members that are rigid in one direction and flexible in another direction provide the desired anisotropic wheelchair frame. This provides desired shock damping in one direction, but maintains the desired strength and rigidity in another direction. The composite tubular members can be constructed with fiber orientation to provide increased hoop strength at areas where a clamp or lug clamp would provide external compression pressures on the tubular member. A different fiber orientation may be desired in the end areas of the composite tubular members where the lugs are inserted into and adhesively bonded to the interior portions of the composite tubular members. Techniques are known in other technology areas for obtaining such varied properties of composite tubular members, which techniques can be readily applied following the teachings of the present invention to achieve the desired designs and properties for the tubular member/lug member wheelchair frames of the present invention.

The tubular member/lug member construction of wheelchair frames according to the present invention also provide numerous advantages in the efficiency of manufacture of the wheelchair frames. For example, the various tubular members for a standard wheelchair frame design can be mass produced in one set of molds for given properties and produced in a maximum length. In the actual assembly of the wheelchair frames, those standard tubular members can then be cut to desired length before assembling with the lug members to provide wheelchair frames of different desired sizes. This is true for both length and height of wheelchair as well as the width of the wheelchair frames. In addition, it will be apparent to one skilled in the art following the teaching of this invention, that various standard members such as cross bars or caster wheel assemblies can also be made in standard lengths and utilized in order to change the dimensions of an existing wheelchair by unclamping one set of standard cross members and replacing them with a different length of cross members to provide a modified width for an existing wheelchair frame.

In the construction of composite tubular members for wheelchair frames reinforcing in accordance with this invention, conventional reinforcing fibers may be used, such as carbon fibers, fiber glass aramid, etc. The polymers used can also be conventional polymers, such as epoxies, polyesters and the like. Another advantage in increased efficiency provided in the manufacture of wheelchair frames according to the present invention is that the composite tubular members can be formed of polymeric materials of desired finish and color, thus eliminating the necessity of finishing or painting the wheelchair frame assembly after it is completed.

Figure 9:
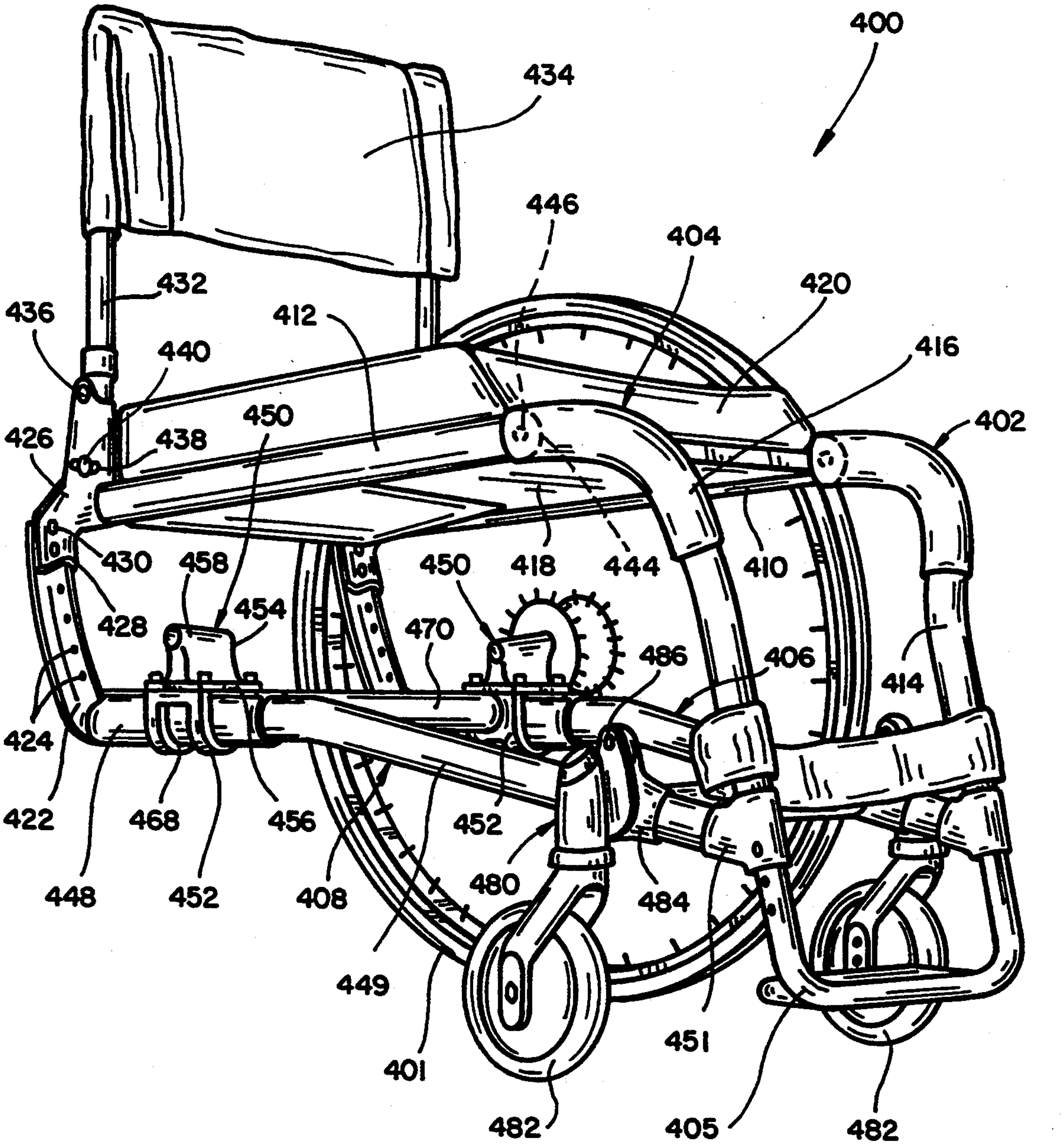
FIG. 9 is a bottom perspective view of a wheelchair and wheelchair frame in accordance with another embodiment of the present invention.

FIG. 9 illustrates a wheelchair and wheelchair frame 400 in accordance with another embodiment of the present invention. The wheelchair and wheelchair frame 400 illustrated in FIG. 9 is similar to the wheelchair and wheelchair frame illustrated in FIG. 1 in that it includes two side-frame assemblies 402, 404. Each side-frame assembly 402, 404 includes a bottom member 406, 408, a seat mounting member 410, 412 and a footrest member 414, 416. A seat pan 418 extends between the seat mounting members 410, 412.

The seat pan 418 can be mounted in a groove formed in each of the seat mounting members 410, 412 in a manner similar to that illustrated in FIG. 8. In addition, the seat member can be of a rigid construction in order to perform a structurally supportive function similar to that described above. That is, the seat pan 418 can be fabricated as a sandwich laminate as shown in FIG. 8 that includes a pair of outside or skin layers separated by a sandwich core. A cushion 420 can be positioned on the seat pan 418.

As in the case of the embodiment of the wheelchair and wheelchair frame described above, the side-frame assemblies 402, 404 are substantially identical to one another. Thus, the following description of features pertaining to one of the side-frame assemblies 404 is equally applicable to the other side-frame assembly 402.

Figure 14:
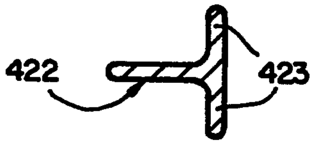
FIG. 14 is a cross-sectional view of the rear end portion of the bottom member along the section line 14—14 in FIG. 13.

The bottom member 408 includes an upwardly curved rear end portion 422 which, as seen in FIG. 14, has a generally T-shaped cross section. The rear end portion 422 of the bottom member 408 is provided with a plurality of spaced apart through holes 424. The bottom member 408 includes a straight portion or rear region 448 extending from the rear end portion 422 and a downwardly extending portion 449 that is connected to the footrest member 416 by way of a lug 451 that can be similar to the lug 308 described above in connection with the embodiment illustrated in FIG. 1.

Figure 15:
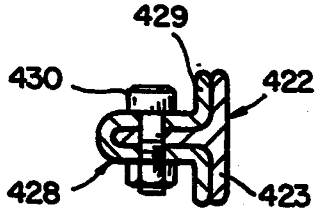
FIG. 15 is a cross-sectional view of the rear end portion of the bottom member and the connecting element along the section line 15—15 in FIG. 13.

The seat mounting member 412 is structurally connected to the rear end portion 422 of the bottom member 408 by way of a connecting member 426. One portion 428 of the connecting 426 has a cross-sectional shape that corresponds to the T-shape of the rear end portion 422 of the bottom member 408. That is, the one portion 428 of the connecting member 426 is generally U-shaped with two outwardly directed flanges 429 that rest against the base portion 423 of the T-shaped rear end portion 422. Such a construction is best illustrated in the cross-sectional view shown in FIG. 15.

The one portion 428 of the connecting member 426 is also provided with at least one through hole, preferably two through holes as illustrated in FIG. 9. The through holes are spaced apart a distance that corresponds to the spacing between the through holes 424 in the rear end portion 422 of the bottom member 408. In that way, the through holes in the one portion 428 of the connecting member 426 can be selectively aligned with various pairs of through holes 424 in the rear end portion 422 of the bottom member 408. Suitable securing means 430 such as a nut and bolt can be provided to removably secure the connecting member 426 to the rear end portion 422 of the bottom member 408 at the desired position.

Figure 13:
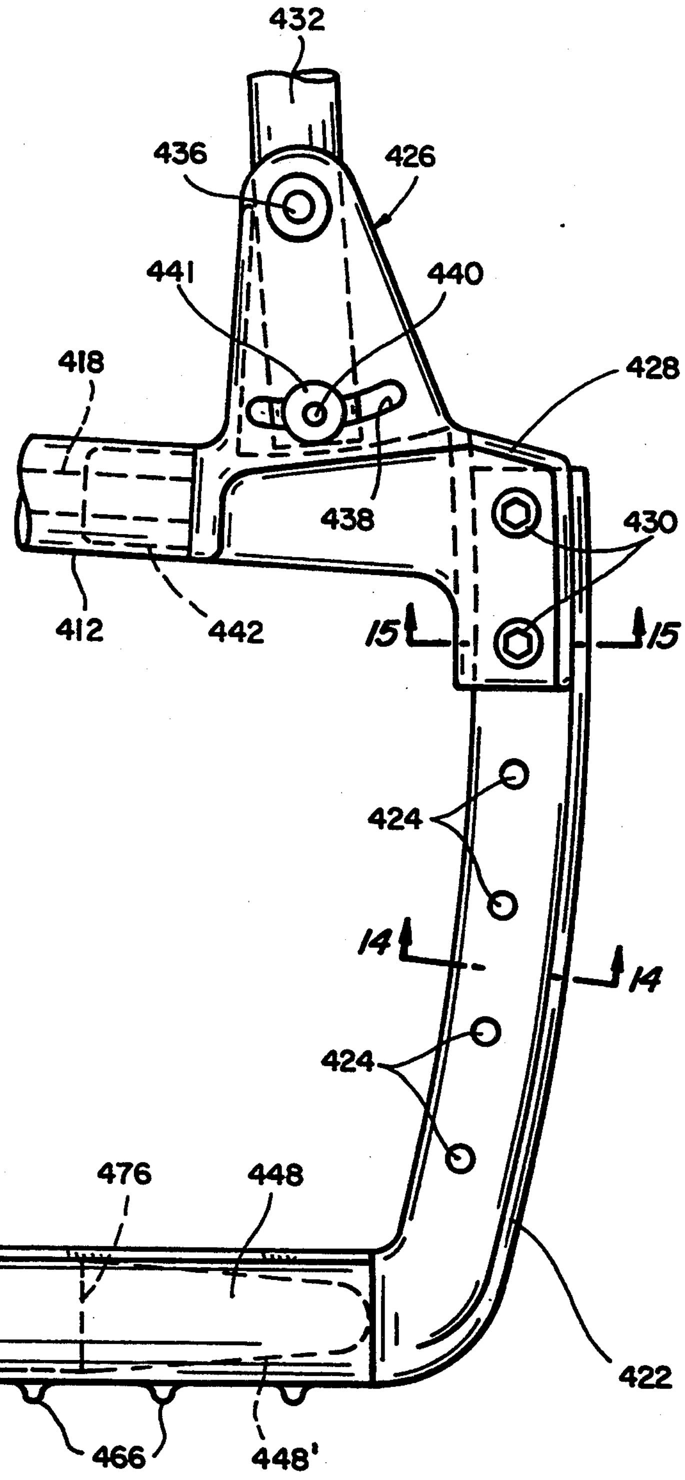
FIG. 13 is a side view of a rear portion of the wheelchair frame shown in FIG. 9.
Figure 13:
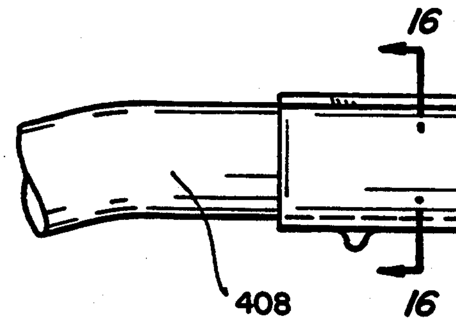

As can also be seen from FIGS. 9 and 13, the connecting member 426 is also pivotally connected to a seat back frame member 432 which serves as a mounting structure for a seat back cushion 434. The connecting member 426 is pivotally connected to the seat back frame member 432 by way of a pivot connection 436.

The connecting member 426 is also provided with an elongated somewhat arcuate slot 438 through which extends a pin 440 that is rigidly connected to the seat back frame member 432. The pin 440 is threaded in order to threadably receive a nut 441. As a result, the seat back frame member 432 can pivot about the pivot connection 436 relative to the seat cushion 420. In that way, the seat back cushion 434 can be inclined or not inclined to the extent desired by the user. The ends of the generally arcuate slot 438 and the connecting member 426 define the extent of pivoting movement allowed by the seat back frame member 432. The nut 441 or other appropriate securing arrangement allows the seat back frame member 432 to be secured at the desired position.

As seen in FIG. 13, the connecting member 426 is preferably provided with an internal lug 442 that is received in a hollow rear end of the seat mounting member 412. The seat mounting member 412 can be tubular and hollow throughout its length. If necessary, the internal lug 442 or the connecting member 426 can have a cross-sectional shape similar to the cross-sectional shape of the seat mounting member shown in FIG. 8 in order to accommodate the seat pan.

The connecting member 426 is preferably fabricated of cast magnesium or aluminum. However, other materials such as fiber reinforced plastic composite material could be employed.

As seen in FIG. 9, the seat mounting member 412 is connected to the footrest member 416 by way of a pivot connection 444. That pivot connection 444 can be similar to the pivot joint and lug assembly 301 described above and illustrated in FIG. 1. Such a construction allows the seat mounting member 412 of each of the side-frame assemblies to be pivoted relative to the footrest member 416.

In addition, the through holes 424 in the upwardly curved rear end portion 422 of the bottom member 408 are disposed along an arc having a radius that originates at the pivot point 446 about which the seat mounting member 412 pivots relative to the footrest member 416. In other words, the through holes 424 are disposed along an arc whose center of curvature coincides with the pivot point 446. As a result, the angle of the seat pan relative to a horizontal plane can be adjusted as desired without affecting the center of gravity of the wheelchair. Moreover, there is no need to adjust the placement or location of the drive wheels 401 in order to effect an adjustment of the seat pan angle. Further, when the drive wheels 401 are provided with tow, the seat pan angle can be adjusted without affecting, changing or altering the tow of the drive wheels 401.

The disposition of the holes 424 along an arc whose radius originates from the pivot point 446 is quite advantageous as it helps to ensure that adjustment of the seat pan angle can be effected without altering any other characteristic of the wheelchair. In essence, the entire wheelchair, except for the seat mounting members 410, 412, is fixed in space while the seat mounting members 410, 412 are free to pivot about the pivot point 446 at the forward region of the frame. Thus, disposition of the holes 424 allows the seta mounting members 410, 412 along with the seat pan 418 to pivot in a way that permits adjustment of the seat pan angle without changing any other aspect or characteristic of the wheelchair such as the position of the drive wheel axles, the position of the drive wheels 401, the position of the casters 482 or the vertical orientation of the longitudinal axis of the caster stem.

In contrast, if the bolt points were disposed in a straight line vertical arrangement (as is the case with other known wheelchairs) rather than an arcuate arrangement centered around a common pivot point, attempts to adjust the seat pan angle would adversely effect other aspects of the wheelchair. For example, in the position shown in FIG. 9, if the rear end of the seat is dropped down, a straight line vertical arrangement of holes would be caused to rotate in the counter-clockwise direction. That rotation of the holes would cause the drive wheel axle to also move. At that point, if the wheel axle were shifted rearwardly in an attempt to compensate for the aforementioned movement, the seat pan angle would also be altered. In addition, the caster alignment of a rigidly mounted caster would be adversely affected. That is, the caster would be forced to move forwardly slightly, (i.e., the longitudinal axis of the caster stem would be rotated clockwise) thereby producing directional instability. As a result, the wheelchair would no longer track in a straight manner. Further, if the wheels are provided with camber, rotation of the straight line vertical arrangement of holes would cause undesirable tow out, which in turn would cause undesirable scrubbing of the wheels and reduced performance.

It is evident, therefore, that the seat pan angle adjustment feature of the present invention offers significant improvements and advantages. In the present invention, it is possible to adjust the seat pan angle without altering the caster alignment (i.e., the vertical orientation of the longitudinal axis of the caster stem, and the position of the caster and caster axle) and without changing or affecting the position of the drive wheel axle (and thus the drive wheel). Further, when the drive wheels 401 are provided with camber, the seat pan angle can be changed without causing undesirable tow in or tow out. Consequently, the seat pan angle can be altered without adversely affecting the performance characteristics of the wheelchair.

Mounted at the rear region 448 of the bottom member 408 is a drive wheel mounting assembly 450. The drive wheel mounting assembly 450 includes a generally U-shaped mounting block 452 and a drive wheel axle receiving element 454. As seen more clearly in FIG. 17, the drive wheel axle receiving element 454 includes a mounting plate portion 456 and an axle receiving portion 458. The mounting plate portion 456 and the axle receiving portion 458 are integral with one another and formed in one piece.

Figure 17:
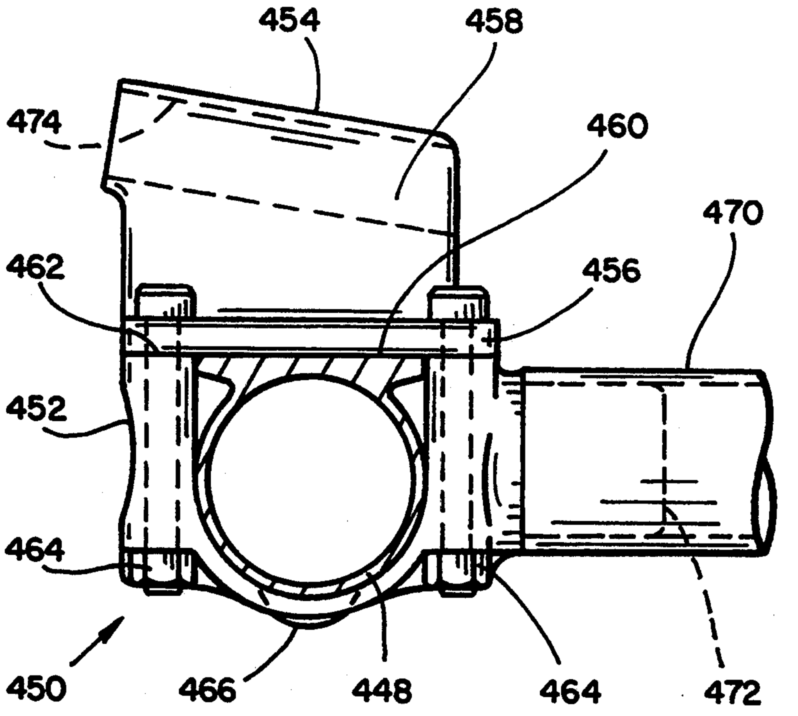
FIG. 17 is a cross-sectional view of the rear region of the bottom member and the attached drive wheel mounting assembly.

As further illustrated in FIG. 17, the rear region 48 of the bottom member 408 has a flat upwardly facing top surface 460 as seen in cross section. The mounting block 452 is dimensioned such that its upwardly facing end surface 462 is substantially coplanar with the flat upwardly facing top surface 462 of the bottom member 408. Thus, when the drive wheel axle receiving element 454 is connected to the mounting block 452, the flat bottom surface of the mounting plate portion 456 rests on the flat upwardly facing top surface 460 of the bottom member 408 as well as the upwardly end surface 462 of the mounting block 452. The drive wheel axle receiving element 454 can be connected to the mounting block 452 by any suitable connecting means 464 such as bolts and nuts. The connecting means 464 is preferably selected to allow the mounting block 452 and the drive wheel axle receiving element 454 to be disconnected from one another for reasons that will become apparent from the discussion below.

The rear region 448 of the bottom member 408 that is provided with a flat upwardly facing top surface 460 is also provided with a plurality of spaced apart indexing keys or teeth 466 that are preferably integral with and formed unitarily with the bottom member. In the preferred embodiment, the indexing keys 466 are positioned opposite the flat upwardly facing top surface 460 of the bottom member 408 and extend along the bottom member 408 substantially the same extent as the flat upwardly facing top surface 460. In addition, the indexing keys 466 on the bottom member 408 associated with the one side-frame assembly 404 are preferably aligned with the indexing keys on the bottom member 406 associated with the other side-frame assembly 402. In that way, the drive wheel mounting assembly 450 positioned on each bottom member 406, 408 can be positioned at the same place along the respective bottom member 406, 408 to ensure that each of the drive wheels is at the same position.

Figure 18:
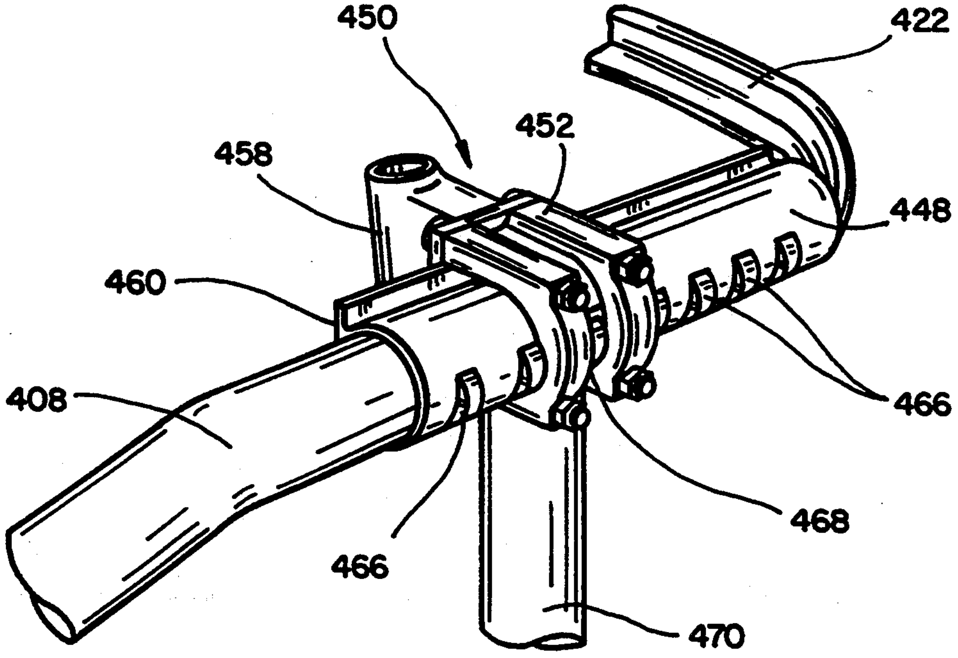
FIG. 18 is a perspective view of a portion of the wheelchair frame generally shown in FIG. 9 illustrating the attachment of the drive wheel mounting assembly to the rear region of the bottom member.

As can be seen from FIG. 18, the generally U-shaped mounting member 452 is provided with a cut-out region 468 in the bottom part thereof. The cut-out region or through opening 468 provides a region through which can extend one of the indexing keys 466. In that way, the drive wheel mounting assembly 450 can be positioned at one of a plurality of different locations along the rear region 448 of the bottom member 408.

As seen in FIG. 9, a drive wheel mounting assembly 450 is secured to each of the bottom members 406, 408. Extending between the mounting block 452 of each drive wheel mounting assembly 450 is a rigid supporting member 470 which serves to connect the side-frame assemblies 402, 404 to one another and impart rigidity to the wheelchair frame. The rigid supporting member 470 and the seat pan 418 that extends between the seat mounting members 410, 412 provide substantially all of the structural support and interconnection between the two side-frame assemblies 402, 404. The one piece footrest 405 that is connected to the footrest members 414, 416 also contributes to the rigid interconnection of the two side-frame assemblies 402, 404.

As seen in FIG. 17, the mounting block 452 is provided with a lug 472 that fits within the hollow interior of the rigid supporting member 470. The supporting member 470 can be hollow throughout its length.

In a manner similar to that described above in connection with the first embodiment of the wheelchair and wheelchair frame, a plurality of drive wheel axle receiving elements 454 can be provided, each of which has an axle receiving hole 474 (see FIG. 17) inclined at a different angle and/or a mounting plate portion 456 having a different thickness. In that way, the drive wheels can be provided with more or less camber. Alternatively, or at the same time, the height of the wheelchair can be adjusted.

Figure 16:
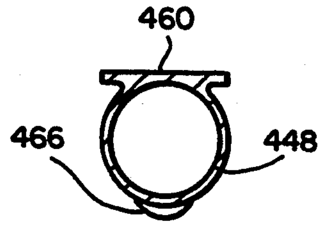
FIG. 16 is a cross-sectional view of the rear region of the bottom member along the section line 16—16 in FIG. 13.

As noted above, the rear region 448 of the bottom member 408 is preferably provided with a flat upwardly facing top surface 460. In contrast, the portion of the bottom member 408 located forward of the rear region 448 is preferably circular in cross section without the flat upwardly facing top surface. It may be useful, therefore, to form the bottom member 408 from two sections; a forward section having a generally circular cross section and a rearward section having the cross section shown in FIG. 16. In addition, the forward section can be provided with a front part 476 that is received in an external lug 448' provided in the rear section (see FIG. 13). Thus, the rear section would be comprised of the external lug 448' in the rear region 448 and the rear end portion 422, while the front section would extend from the rear region 448 to the point at which the bottom member 408 is connected to the footrest member 416. The external lug 448' can be provided with a hollow that extends beyond the free end of the front part 476. The free end of the front part 476 is represented with a dotted line in FIG. 13.

The front part 476 which connects the rearward and forward regions can be secured inside the external lug 448' of the bottom member in any suitable manner such as, for example, by welding. The forward section of the bottom member 408 can be formed of aluminum tubing or fiber reinforced plastic composite material. Likewise, the rear section of the bottom member 408 can be fabricated of cast magnesium or aluminum, or any other suitable material such as fiber reinforced plastic composite material. The front and rear sections can be fabricated of the same material or different materials.

Another aspect of the second embodiment of the wheelchair and wheelchair frame 400 illustrated in FIG. 9 pertains to the caster mounting assembly 480 which allows a caster wheel 482 to be secured to both of the bottom members 406, 408. Preferably, a lug mount 484 is fixedly attached to the bottom member 408. The caster wheel mounting assembly 480 is attached to the lug mount 484 by way of suitable connecting means 486 such as nuts and bolts.

Figure 10:
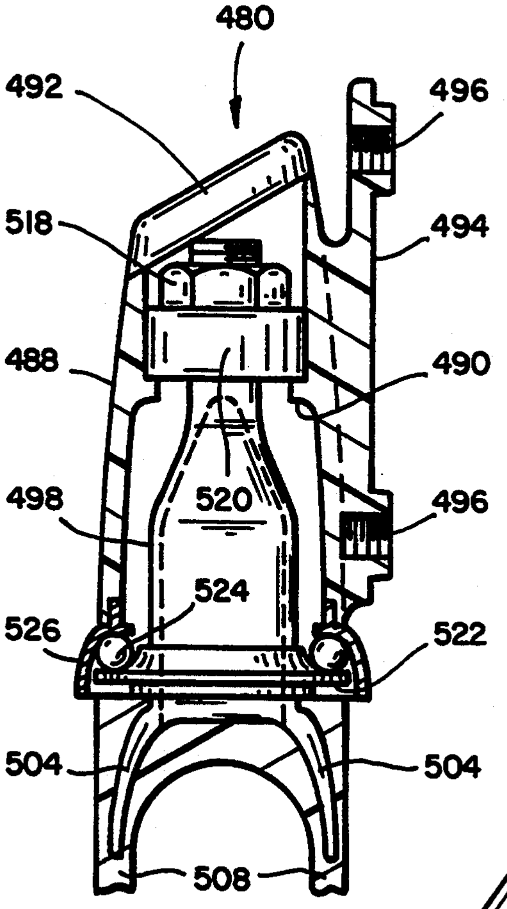
FIG. 10 is a cross-sectional view of a portion of the caster wheel mounting assembly which is generally shown in FIG. 9.
Figure 11:
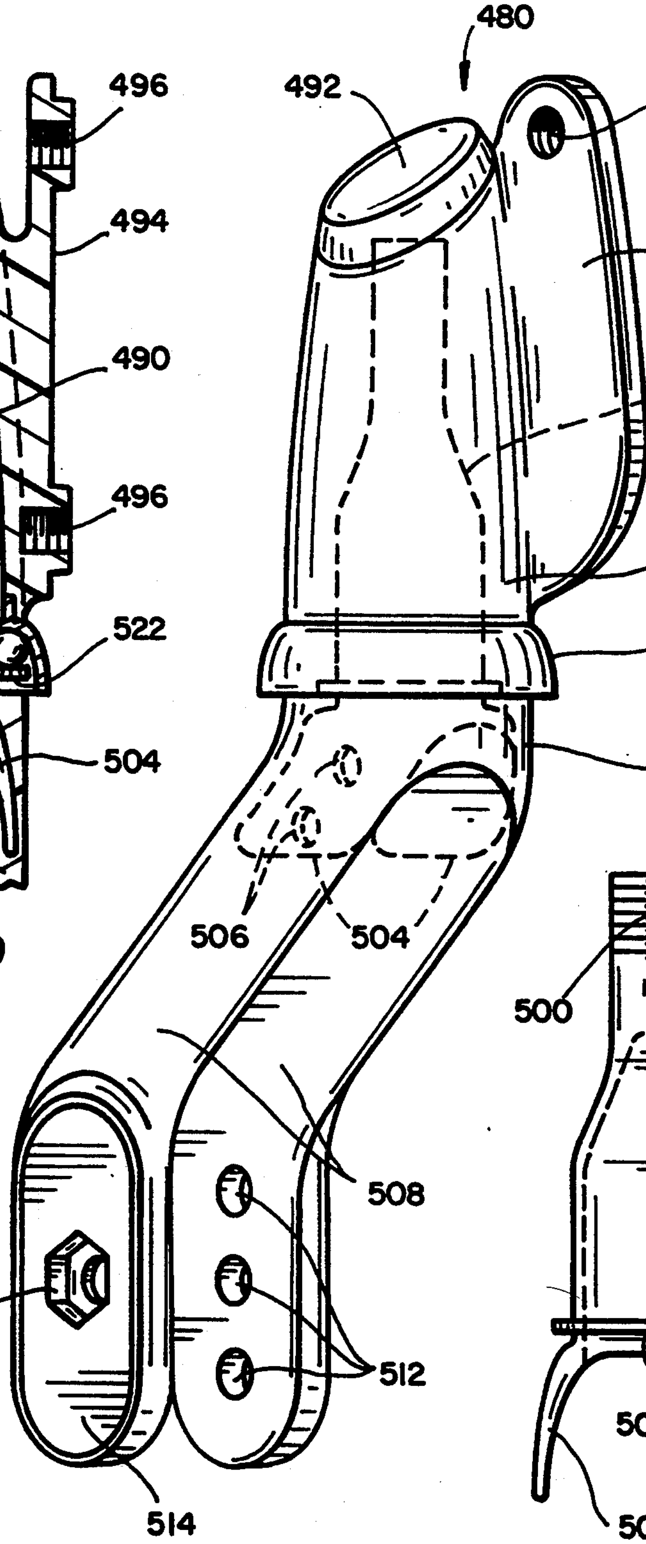
FIG. 11 is a bottom perspective view of the caster wheel mounting assembly generally shown in FIG. 9.
Figure 12:
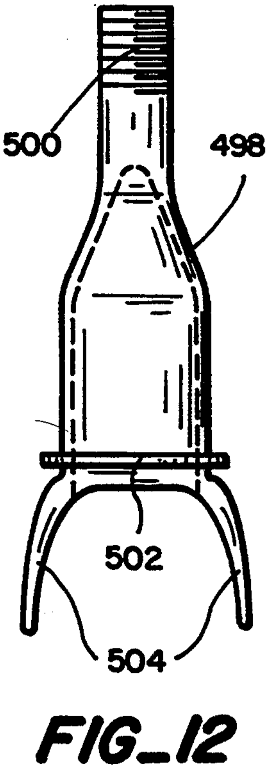
FIG. 12 is a portion of the caster wheel mounting assembly illustrated in FIG. 11.

FIGS. 10–12 illustrate further details and features associated with the caster wheel mounting assembly 480. The caster wheel mounting assembly 480 includes a hollow caster sleeve 488 having an inwardly directed ledge 490. A removable cap 492 can be attached to the top of the caster sleeve 488 to allow access to the interior of the caster sleeve. The caster sleeve 488 is also provided with a lug 494 which is to be secured by the aforementioned suitable connecting means to the lug mount 484 that is secured to the bottom member 408. As seen in FIG. 10, the lug mount 494 can be provided with through holes 496 for receiving suitable connecting means in the form of, for example, nuts and bolts.

The caster wheel mounting assembly 480 also includes a hollow stem 498 that is provided with a threaded end portion 500. As seen in FIG. 12, the stem 498 is also provided with a shoulder 502 and two oppositely positioned downwardly extending flanges. As seen in FIG. 11, each of the downwardly extending flanges 504 is provided with several through holes 506.

The caster wheel mounting assembly 480 further includes a caster wheel mount comprised of two spaced apart forks 508 that are connected to one another at their upper regions 510. The space between the two forks 508 is intended to receive the caster wheel. In particular, as seen in FIG. 11, each fork 508 is provided with a plurality of spaced apart through holes 512 which are adapted to receive the axle of a caster wheel. The plurality of through holes 512 allows different diameter caster wheels to be mounted on the same pair of forks. A washer 514 can be positioned in a recess formed on the outwardly facing surface of each of the forks 508. The washer 514 is provided with a through hole 516 that is adapted to be aligned with one of the through holes in the forks 508. Depending upon the diameter of the caster wheel being mounted on the forks, different washers will be employed. That is, if the axle of the caster wheel is to be mounted in the uppermost through holes 512 and the forks 508, washers 514 can be employed which each have a through hole that aligns with the uppermost through holes 512 and the forks. On the other hand, if the axle of the caster wheel is to be mounted on the intermediate through holes 512 on the forks 508, washers 514 similar to that illustrated in FIG. 11 can be employed.

The through holes 506 in the flanges 504 extending from the stem 498 allow the flanges 504 to be secured to the forks 508 in any suitable manner. In that way, the forks 508 and the stem 498 move together as a single unit.

As further seen in FIG. 10, a nut 518 is threadably engaged with the threaded end 500 of the stem. Further, a bearing 520 is positioned between the nut 518 and the inwardly directed ledge 490 on the caster sleeve 488. The bearing 520 actually rests upon the inwardly directed ledge 490 while the nut 518 rests on the bearing 520.

A bearing race 522 is positioned on the shoulder 502 formed on the stem 498. Suitable bearings 524 rest on the bearing race 522. In that way, the bearings 524 are positioned between the bearing race 522 and an annular bearing surface 526 formed at the end of the caster sleeve 488.

The caster wheel mounting assembly 480 illustrated in FIGS. 10–12 provides relatively free and easy movement of the caster wheel relative to the wheelchair frame. The stem 498 is preferably made of steel while the flanges 504 are overmolded to the stem in an injection molding process. The forks 508 are also preferably injection molded of fiber reinforced plastic composite material. Likewise, the caster sleeve 488 is injection molded of plastic material, possibly fiber reinforced plastic composite material. Alternatively, the forks 508 can be of an aluminum or magnesium construction.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed without departing from the spirit of the present invention, and it is expressly intended that all such variations, changes and equivalents which fall within the spirit and scope of the present invention as defined in the claims be embraced thereby.

What is claimed is:

1. A wheelchair frame comprising:

a pair of side frame assemblies, each of which includes a bottom member and a seat mounting member that are connected to one another, each bottom member having a flat upwardly facing surface at a rear region of the bottom member;

a generally U-shaped mounting block mounted on each bottom member at the rear region of the bottom member, each mounting block being open upwardly and having an upwardly facing end surface;

drive axle receiving means mounted on each mounting block for receiving a drive wheel axle, each drive wheel axle receiving means including a mounting plate portion and an axle receiving portion, said mounting plate portion and said axle receiving portion being integral and formed in one piece, said mounting plate being positioned on the end surface of a respective mounting block and resting on the upwardly facing flat surface at the rear region of the bottom member;

connection means for removably connecting said drive axle receiving means to a respective mounting block to allow the drive axle receiving means to be disconnected from the respective mounting block so that the drive axle receiving means and the mounting blocks can be moved longitudinally along the rear region of the bottom member; and support means for rigidly connecting said side frame assemblies to one another, said support means including a cross-bar connected to each mounting block and extending between the side frame assemblies.

2. The wheelchair frame according to claim 1, wherein each mounting block has a through slot formed therein, the rear region of each bottom member having a plurality of indexing keys extending therefrom, each mounting block being mounted on its respective bottom member such that one of the indexing keys extends through the slot in the mounting block.

3. The wheelchair frame according to claim 1, wherein said support means also includes a rigid seat pan extending between the seat mounting member of each side frame assembly, each of said seat mounting members being provided with a slot that faces toward the other seat mounting member, said seat pan being received in the slot of each seat mounting member.

4. The wheelchair frame according to claim 3, wherein said rigid seat pan comprises a sandwich laminate having a pair of spaced apart load bearing skin layers.

5. The wheelchair frame according to claim 1, wherein each bottom member includes an upwardly extending rear end portion which has a generally T-shaped cross-section, and including a connecting member connected to each seat mounting member for connecting each seat mounting member to a respective bottom member, said connecting member being shaped to be mounted on the rear end portion of the respective bottom member.

6. The wheelchair frame according to claim 5, including footrest members having first and second ends, the first end of each footrest member being pivotally connected to one of the seat mounting members and the second end of the footrest member being rigidly connected to one of the bottom members, and including means for securing each connecting member to the rear end portion of the respective bottom member at one of a plurality of different locations along the length of the rear end portion to thereby permit each seat mounting member to pivot relative to the footrest member to which it is pivotally connected.

7. The wheelchair frame according to claim 6, wherein said means for securing the connecting member to the rear end portion at one of a plurality of different locations includes a plurality of through holes formed in the rear end portion of each bottom member and at least one through hole formed in the connecting member, said plurality of holes in the rear end portion of the bottom member being disposed along an arc having a center of curvature located at the pivot connection of the seat mounting member and the footrest member.

8. The wheelchair frame according to claim 1, including a caster wheel mounting assembly connected to each bottom member at a forward region of the respective bottom member, each caster mounting assembly including a one-piece caster wheel mount comprised of two spaced apart forks for receiving therebetween a caster wheel, a stem connected to the caster wheel mount, a caster sleeve in which the stem is mounted, and bearing means disposed between the caster sleeve and the stem for allowing rotational movement of the caster sleeve relative to the stem and the caster wheel mount.

9. A wheelchair frame comprising:

a pair of side frame assemblies which each include a bottom member and a seat mounting member connected to the bottom member;

drive wheel axle mounting means mounted on each bottom member for mounting a drive wheel on each side frame assembly;

rigid support means extending between the two side frame assemblies for rigidly connecting the two side frame assemblies to one another; and a caster wheel mounting assembly connected to each bottom member, each caster wheel mounting assembly including a caster wheel mount having two spaced apart forks for receiving therebetween a caster wheel, means for mounting a caster wheel on said forks, a stem connected to the caster wheel mount, a caster sleeve in which the stem is positioned, and bearing means disposed between the caster sleeve and the stem for allowing rotational movement of the caster sleeve relative to the stem and the caster wheel mount.

10. The wheelchair frame according to claim 9, wherein each caster sleeve includes a lug for connecting the caster wheel mounting assembly to a lug mount disposed on each bottom member.

11. The wheelchair frame according to claim 9, wherein each caster sleeve has a hollow interior and is provided with an inwardly directed ledge on the interior, each stem having an upper end which extends through a bearing, said upper end being threaded and having a nut threadably engaged therewith so that the nut rests on the bearing, said bearing resting on the inwardly directed ledge.

12. The wheelchair frame according to claim 9, wherein each stem includes an outwardly directed shoulder, said bearing means including a bearing race mounted on the shoulder, and bearings disposed in the bearing race, said bearings being located between the bearing race and an interior surface of the caster sleeve.

13. The wheelchair frame according to claim 12, wherein said stem is made of metal and includes two plastic flanges secured to the stem for connecting the stem to the caster wheel mount, said caster sleeve and said caster wheel mount being made of plastic.

14. The wheelchair frame according to claim 11, wherein a rear region of each bottom member has a flat upwardly facing surface, and wherein each drive wheel axle mounting means includes a mounting block mounted on the rear region of each bottom member and a separate drive axle receiving means, said drive axle receiving means being comprised of a mounting plate portion and an axle receiving portion, said axle receiving portion and said mounting plate portion being integral and formed in one piece, said mounting plate portion being positioned on an end surface of a respective mounting block and resting upon the flat upwardly facing surface at the rear region of the bottom member.

15. The wheelchair frame according to claim 11, wherein each bottom member includes an upwardly extending rear end portion which has a generally T-shaped cross-section, and including a connecting member connected to each seat mounting member for connecting said seat mounting member to a respective bottom member, said connecting member being shaped to be mounted on the rear end portion of the respective bottom member.

16. The wheelchair frame according to claim 15, including footrest members having first and second ends, the first end of each footrest member being pivotally connected to one of the seat mounting members of a respective side frame assembly and the second end of each footrest member being rigidly connected to the bottom member of the respective side frame assembly, and including means for securing the connecting member to the rear end portion of the bottom member at one of a plurality of different locations along the length of the rear end portion to thereby permit each seat mounting member to pivot relative to the footrest member to which it is pivotally connected.

17. A wheelchair frame comprising:

a pair of side frame assemblies which each include a bottom member, a seat mounting member having a rear end that is connected to the rear end of the bottom member, and a footrest member connected to the seat mounting member and the bottom member;

drive wheel axle mounting means mounted on each bottom member for mounting a drive wheel on each side frame assembly;

caster wheel mounting means mounted on each bottom member for mounting a caster wheel on each side frame assembly;

rigid support means extending between the two side frame assemblies for rigidly connecting the two side frame assemblies to one another; and connecting means for connecting each seat mounting member to an upwardly curved rear end portion of a respective bottom member, said upwardly curved rear end portion of each bottom member having a plurality of spaced apart mounting positions, each connecting means being shaped to mate with the rear end portion of the respective bottom member and each connecting means having at least one through hole extending therethrough, each connecting means being movable along the rear end portion of the respective bottom member so that the through hole in the connecting means is alignable with one of the mounting positions.

18. The wheelchair frame according to claim 17, wherein each seat mounting member is pivotally connected to a respective footrest member at a pivot connection.

19. The wheelchair frame according to claim 18, wherein said plurality of mounting positions on the rear end portion of each bottom member are disposed along an arc having a center of curvature that coincides with the pivot connection at which the seat mounting member and the footrest member of a respective side frame assembly are connected.

20. The wheelchair frame according to claim 19, wherein said plurality of mounting positions comprises a plurality of through holes formed in the rear end portion of each bottom member, each connecting means having two through holes extending therethrough for being aligned with two of the holes in the rear end portion of the respective bottom member.

21. The wheelchair frame according to claim 18, wherein the rear end portion of each bottom member has a T-shaped cross-section, said connecting means having a generally U-shaped cross-section with two outwardly directed flanges.

22. The wheelchair frame according to claim 17, including a seat back frame member pivotally connected to each connecting means, each seat back frame member having a pin which extends through an elongated slot in a respective connecting means and securing means mounted on the pin for allowing the seat back frame to be pivoted and secured in place at one of a plurality of different orientations.

23. The wheelchair frame according to claim 17, wherein each seat mounting member includes a slot which faces towards the other seat mounting member, said rigid supporting means including a rigid seat pan positioned in the slot in each seat mounting member.

24. The wheelchair according to claim 18, wherein a rear region of each bottom member has a flat upwardly facing surface, and wherein each drive wheel axle mounting means includes a mounting block mounted on the rear region of each bottom member and a separate drive axle receiving means, said drive axle receiving means comprising a mounting plate portion and an axle receiving portion, said axle receiving portion and said mounting plate portion being integral and formed in one piece, said mounting plate portion being positionable on an end surface of a respective mounting block and resting upon the flat upwardly facing surface at the rear region of the bottom member.

25. The wheelchair frame according to claim 24, including a caster wheel mounting assembly connected to each bottom member at a forward region of the bottom member, each caster mounting assembly including a one-piece caster wheel mount comprised of two spaced apart forks for receiving therebetween a caster wheel, a stem connected to the caster wheel mount, a caster sleeve in which the stem is positioned, and bearing means disposed between the caster sleeve and the stem for allowing rotational movement of the caster sleeve relative to the stem and the caster wheel mount.

* * * * *